United States Patent
Yu et al.

(10) Patent No.: US 7,531,970 B2
(45) Date of Patent: May 12, 2009

(54) POWER SOURCE DRIVING CIRCUITS AND CONTROLLERS THEREOF

(75) Inventors: Chung-Che Yu, Taipei (TW); Chien-Pang Hung, Taipei (TW); Chih-Shun Lee, Taipei (TW); Chin-Fa Kao, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 670 days.

(21) Appl. No.: 11/385,536

(22) Filed: Mar. 20, 2006

(65) Prior Publication Data

US 2007/0126373 A1     Jun. 7, 2007

(30) Foreign Application Priority Data

Dec. 2, 2005    (TW) ................ 94142546 A

(51) Int. Cl.
*G05F 1/00*    (2006.01)

(52) U.S. Cl. .......... 315/291; 315/307; 315/308; 315/224; 315/128; 315/DIG. 7; 363/109; 363/98; 363/21.05; 363/21.09; 363/56.03; 363/56.05

(58) Field of Classification Search .......... 315/291, 315/307, 308, 224, 247, 244, 276, 209 R, 315/119, 128, 131, DIG. 7; 363/98, 109, 363/97, 25, 21.01–21.11, 56.01–56.08
See application file for complete search history.

(56) References Cited

U.S. PATENT DOCUMENTS

| | | | |
|---|---|---|---|
| 5,729,096 A | 3/1998 | Liu et al. | |
| 7,148,633 B2 * | 12/2006 | Yu et al. | 315/224 |
| 7,394,209 B2 * | 7/2008 | Lin et al. | 315/247 |
| 7,411,360 B2 * | 8/2008 | Henry | 315/307 |
| 7,417,382 B2 * | 8/2008 | Lin | 315/225 |

FOREIGN PATENT DOCUMENTS

CN    1387394    12/2002

OTHER PUBLICATIONS

CN Office Action mailed Jun. 20, 2008.

* cited by examiner

*Primary Examiner*—Haissa Philogene
(74) *Attorney, Agent, or Firm*—Thomas, Kayden, Horstemeyer & Risley

(57) ABSTRACT

A controller for a driving circuit of power source comprises a frequency generator, a pulse width modulator, and a driving device. The frequency generator comprises a latch circuit. The frequency generator provides a pulse signal at a first frequency after the controller is started. After the frequency generator receives an indicating signal, the frequency generator changes the frequency of pulse signal from the first frequency to a second frequency and locks the frequency of pulse signal at the second frequency. The pulse width modulator provides a PWM signal according to the pulse signal and a feedback signal which indicates a status of electric power supply of the driving circuit. The driving device controls semiconductor switches according to the PWM signal.

20 Claims, 9 Drawing Sheets

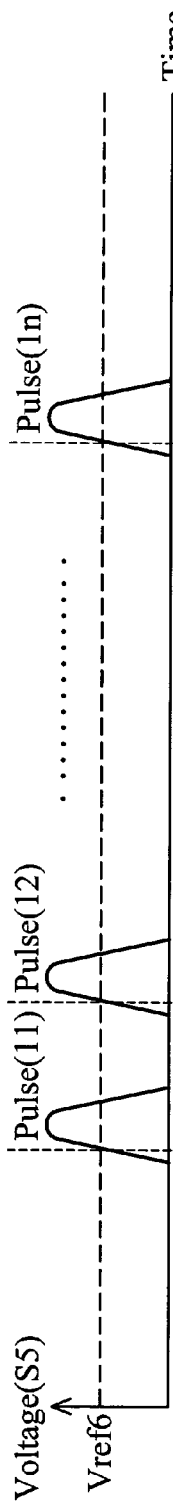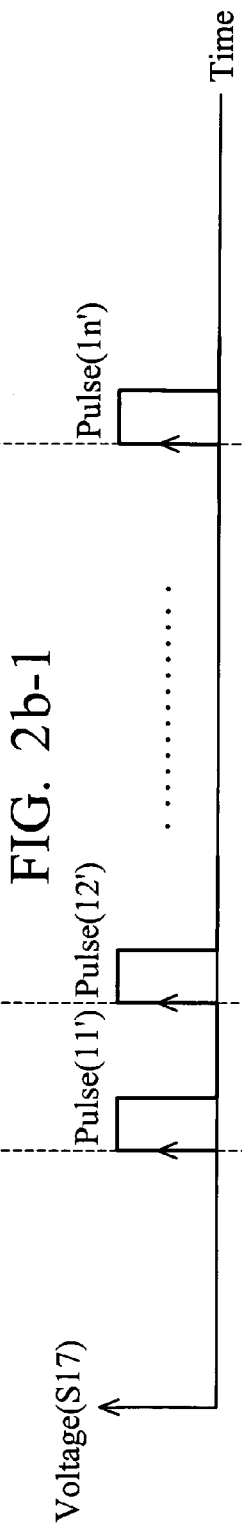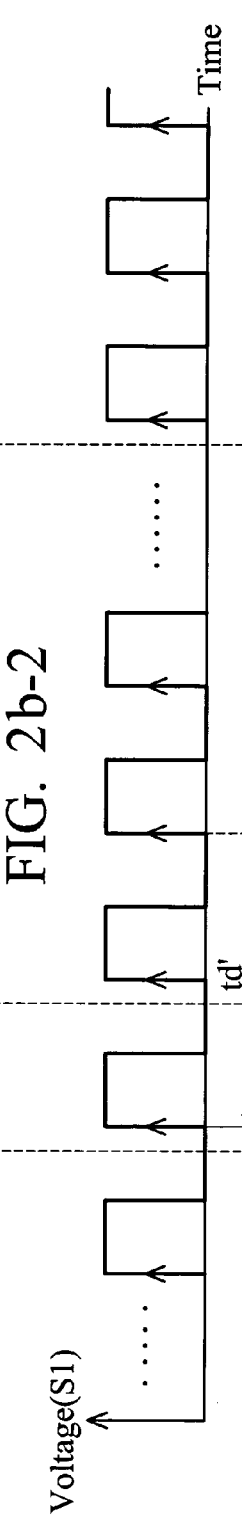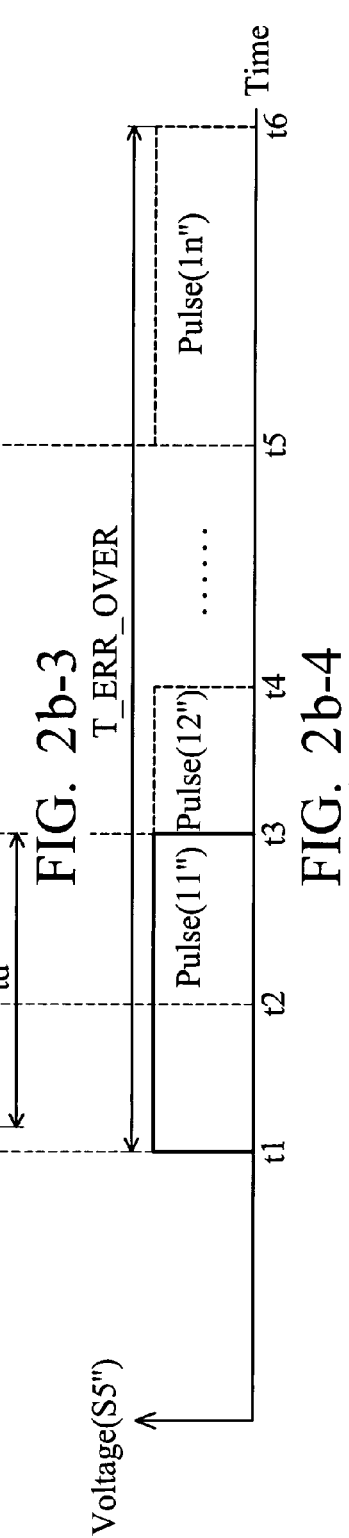
FIG. 2b-1    FIG. 2b-2    FIG. 2b-3    FIG. 2b-4

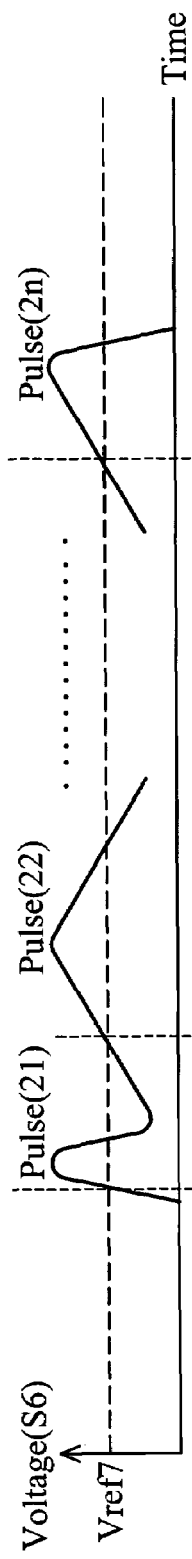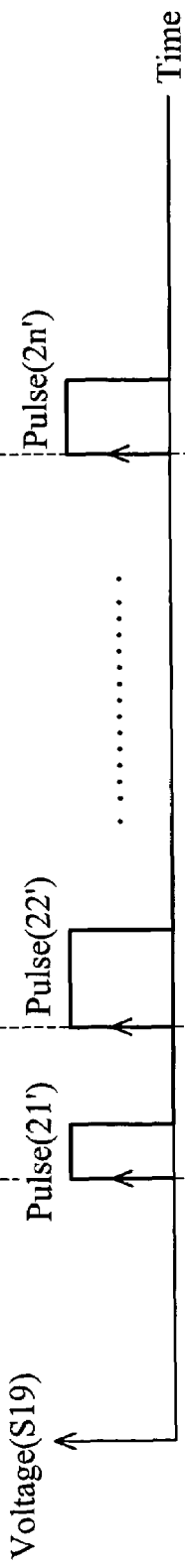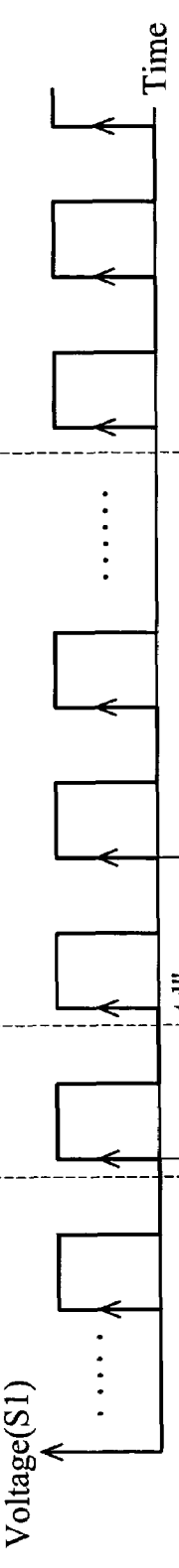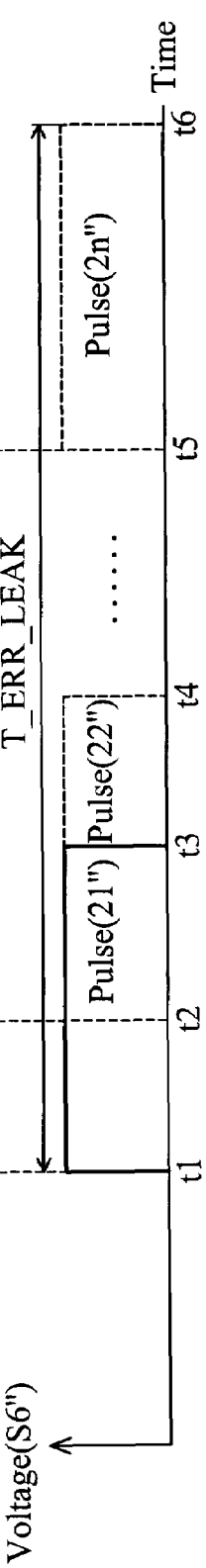
FIG. 2c-1  FIG. 2c-2  FIG. 2c-3  FIG. 2c-4

POWER SOURCE DRIVING CIRCUITS AND CONTROLLERS THEREOF

BACKGROUND OF THE INVENTION

1. Field of the Invention

The present invention relates to a DC/AC inverting circuit, and in particular relates to a controller applied in a DC/AC inverting circuit.

2. Description of the Related Art

Liquid crystal displays (LCDs) are thinner and occupy less space than a conventional cathode ray tube (CRT) displays. LCDs are applied in household televisions and public signboards. LCDs display images and text by optical rotation of liquid crystal materials and electronic optics. Since a panel of an LCD device is not able to light itself, an additional backlight source is used to assist in emitting light. Fluorescent lamps typically serve as the backlight.

A DC/AC driving circuit is used to drive the fluorescent lamps and is usually referred as an inverter. The DC/AC driving circuit always uses a constant frequency for backlight of the LCD to reduce interference. The invention provides a control method for determining an operational frequency according the states of the fluorescent lamps, simplifying the design of the inverter.

BRIEF SUMMARY OF THE INVENTION

An exemplary embodiment of a controller for a driving circuit of power source comprises a frequency generator, a pulse width modulator, and a driving device. The frequency generator comprises a latch circuit. The frequency generator provides a pulse signal at a first frequency after the controller is started. After the frequency generator receives an indicating signal, the frequency generator changes the frequency of the pulse signal from the first frequency to a second frequency and locks the frequency of the pulse signal at the second frequency. The pulse width modulator provides a PWM signal according to the pulse signal and a feedback signal which indicates electric power supply status of the driving circuit of power source. The driving device controls semiconductor switches according to the PWM signal.

An exemplary embodiment of a DC/AC driving circuit for driving a fluorescent lamp comprises at least one switch, a controller, a resonant tank, and a feedback loop. The at least one switch is coupled to a first power source. The controller outputs at least one driving control signal corresponding to the at least one switch to control the power source to turn on or off. The resonant tank has a first side and a second side. The first side is coupled to the at least one switch, and the second side is coupled to the fluorescent lamp to provide power to the fluorescent lamp. The feedback loop is coupled to the fluorescent lamp and outputs an indicating signal to the controller when the fluorescent lamp is turned on. The controller controls the at least one driving control signal to be at a first frequency after the DC/AC driving circuit is started. After the controller generator receives the indicating signal, the controller changes the frequency of the at least one driving control signal from the first frequency to a second frequency and the frequency of the at least one driving control signal is locked at the second frequency.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 2a-1 to 2a-4, 2b-1 to 2b-4, and 2c-1 to 2c-4 are timing charts of embodiments of protection operations.

FIG. 3 depicts some amended circuits in the DC/AC driving circuit of FIGS. 1a to 1d.

FIG. 4 depicts some amended circuits in the DC/AC driving circuit of FIGS. 1a to 1d.

DETAILED DESCRIPTION OF THE INVENTION

Figure 1A:
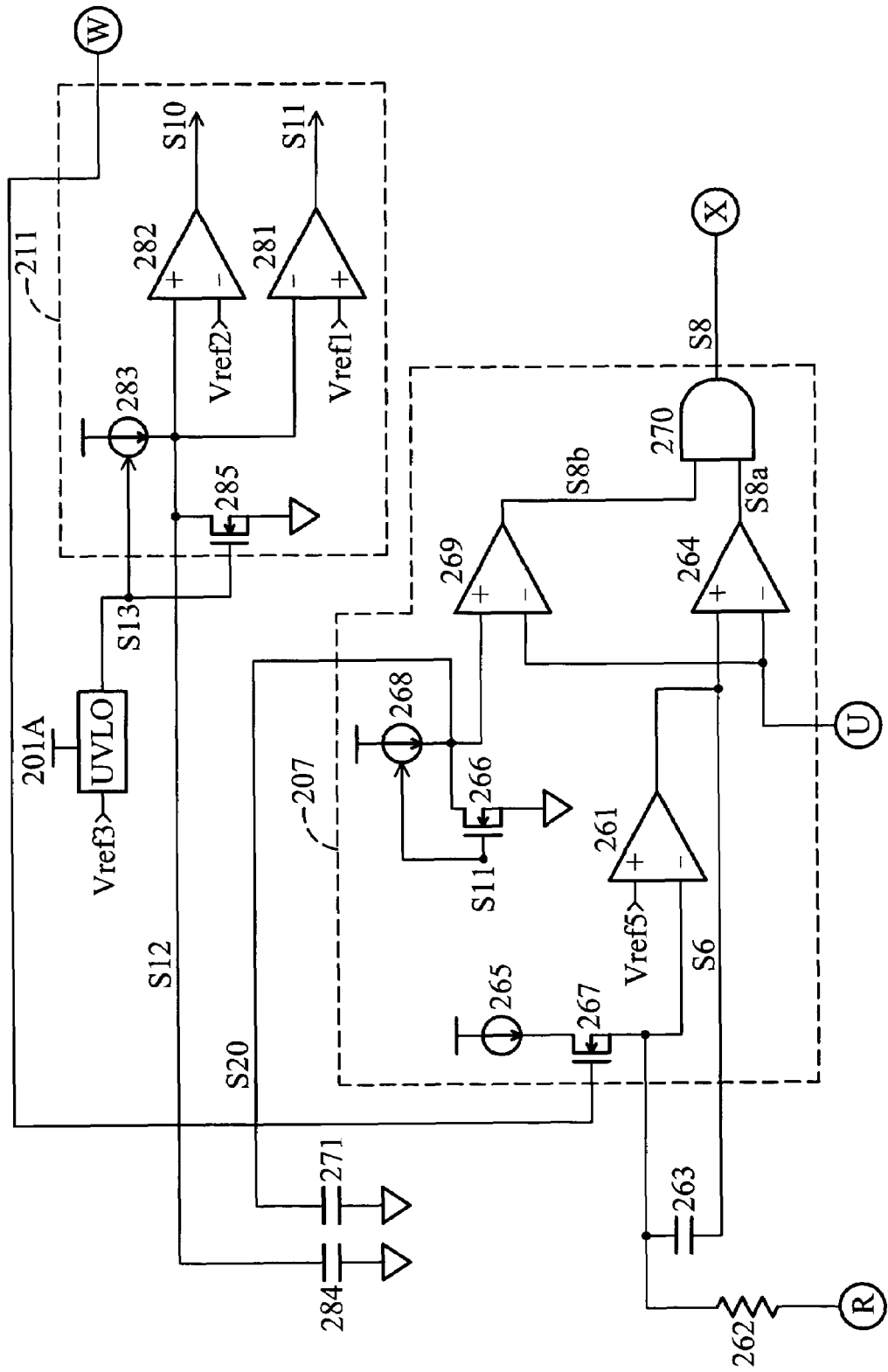
FIGS. 1a to 1d depict an exemplary embodiment of a DC/AC driving circuit.
Figure 1B:
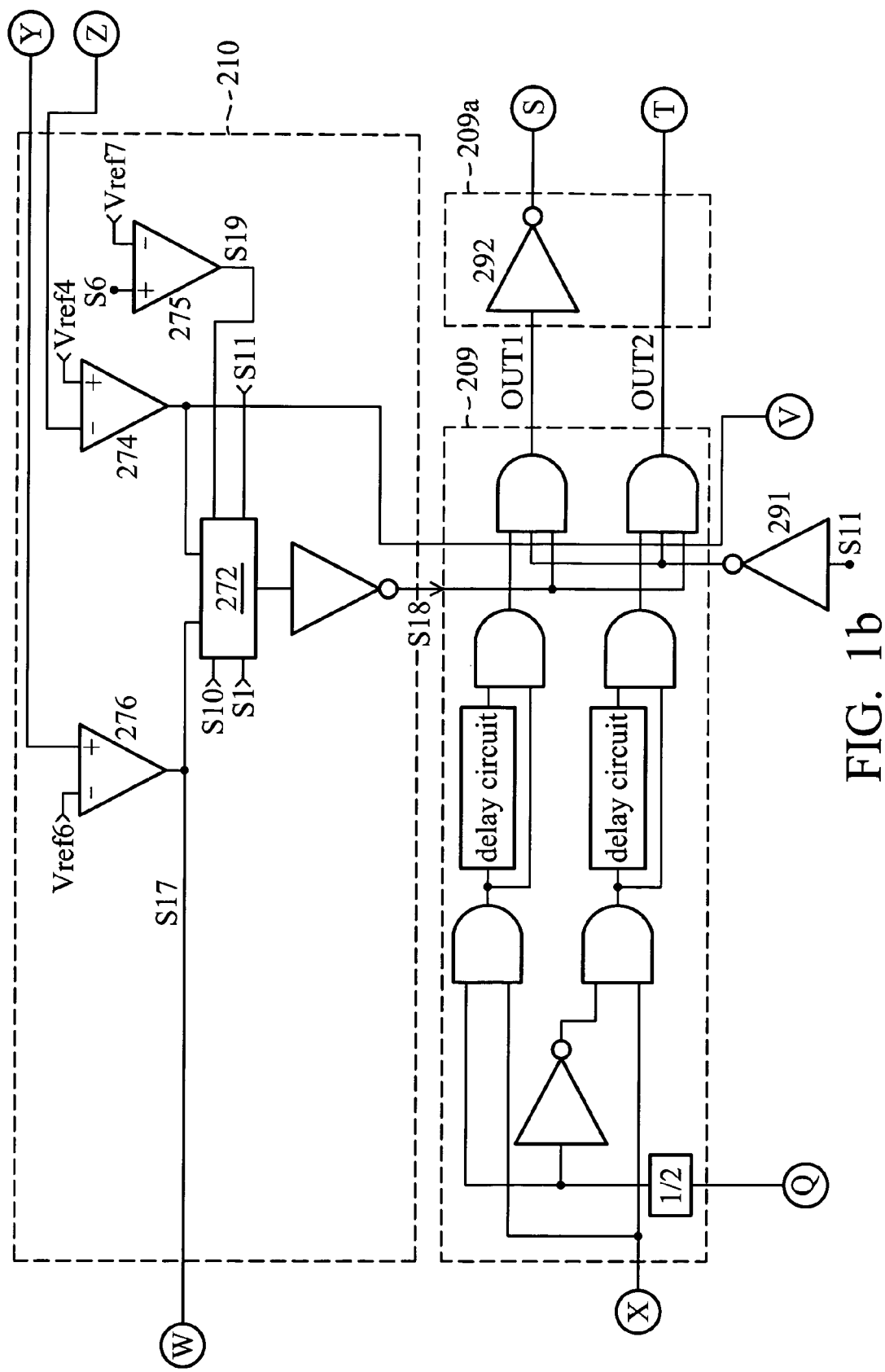

The following description is of the best-contemplated mode of carrying out the invention. This description is made for the purpose of illustrating the general principles of the invention and should not be taken in a limiting sense. The scope of the invention is best determined by reference to the appended claims.

In an exemplary embodiment of a DC/AC driving circuit in FIGS. 1a to 1d, a DC/AC driving circuit for a fluorescent lamp comprises a DC voltage source 201, a semiconductor switch unit 202, a resonant tank 203, a fluorescent lamp 204, a current detecting circuit 205 for the fluorescent lamp 204, a voltage detecting circuit 206 for the fluorescent lamp 204, a pulse width modulator 207, a frequency generator 208, a driving device 209, a signal transforming circuit 209a, a protection circuit 210, and a timer 211.

The DC voltage source 201 is coupled to the semiconductor switch unit 202. An output terminal of the semiconductor switch unit 202 is coupled to an input terminal of the resonant tank 203. An output terminal of the resonant tank 203 is coupled to one of two terminals of the fluorescent lamp 204. The resonant tank 203 comprises a step-up transformer 221 and resonance capacitors 222 to 224.

The two terminals of the fluorescent lamp 204 are respectively coupled to the current detecting circuit 205 and the voltage detecting circuit 206. The current detecting circuit 205 is also coupled to the pulse width modulator 207, and the pulse width modulator 207 is coupled to the frequency generator 208 and the driving device 209. The driving device 209 is coupled to the semiconductor switch unit 202 through the signal transforming circuit 209a, so that the DC/AC driving circuit forms a control feedback.

The semiconductor switch unit 202 comprises two semiconductor switches 202A and 202B. The switch 202A can be a P-type metal-oxide-semiconductor (PMOS) transistor switch, and the switch 202B can be an NMOS transistor switch. The MOS transistors are not a limitation for the switches 202A and 202B, and they can be other categories of transistor switch, such a NPN-type or PNP-type bipolar junction transistor (BJT).

The frequency generator 208 generates a triangular wave signal S2 and a pulse signal S1 which have the same frequency. A triangular wave is not a limitation for the signal S2, and the signal S2 can be a ramp signal or sawtooth wave.

The current detecting circuit 205 is coupled to the fluorescent lamp 204 in series and provides a signal S3 indicating the state of the fluorescent lamp 204 and a signal S4 indicating the value of the current flowing through the fluorescent lamp 204.

The voltage detecting circuit 206 generates a signal S5 indicating the voltage of the fluorescent lamp 204 by the resonance capacitors 223 and 224 of the resonant tank 203 coupled to the fluorescent lamp 204 in parallel.

The pulse width modulator 207 comprises an error amplifier 261, a comparator 264, and an inverting integrator composed of a resistor 262, and a capacitor 263. The pulse width modulator 207 further comprises a current source 265 and a switch 267. The current source 265 is coupled to an, inverting input terminal of the error amplifier 261 through the switch 267, and the switch 267 is controlled by a feedback signal S17 indicating the voltage of the fluorescent lamp 204.

Moreover, the pulse width modulator 207 comprises a soft-start comparator 269, a current source 268 controlling the soft-start operation, and a capacitor 271 controlling the soft-start operation.

An output signal S8a of the comparator 264 and an output signal S8b of the soft-start comparator 269 are input to an AND logic gate 270 and logically calculated. The operated result of the AND logic gate 270 is obtained to serve as an output signal S8 of the pulse width modulator 207.

The protection circuit 210 comprises a logic control circuit 272. The protection circuit 210 receives the signal S3 indicating the state of the fluorescent lamp 204, the signal S5 indicating the voltage of the fluorescent lamp 204, and an output signal S6 of the error amplifier 261 of the pulse width modulator 207.

The timer 211 comprises two comparators 281 and 282 and a current source 283.

The driving device 209 generates two driving output signals OUT1 and OUT2 according to the output signal S8 of the pulse width modulator 207, the pulse signal S1 from the frequency generator 208, and an output signal S18 of the protection circuit 210. The driving output signal OUT1 is inverted by an inverter 292 of the signal transforming circuit 209a, and the inverted driving output signal OUT1 is used to control the switches 202A. The driving output signal OUT2 directly controls the switches 202B.

In the embodiment, the timer 211 is operated by charging a timer capacitor 284 via the current source 283, so that voltage S12 of the timer capacitor 284 rises with increased time. Before the voltage S12 of the timer capacitor 284 exceeds a reference level Vref1, the timer 211 outputs a reset signal S11. When the voltage S12 of the timer capacitor 284 exceeds a reference level Vref2, the timer 211 outputs a time out signal S10. The reset signal S11 can serve as a reset signal of the analog or digital circuit of the DC/AC driving circuit, such as the pulse width modulator 207, the frequency generator 208, the driving device 209, and the logic control circuit 272 to reset them at appropriate time. The current source 283 is controlled by a signal S13 indicating the state of a DC voltage source of control system 201A. When voltage of the DC voltage source 201A is lower than a reference level Vref3, the current source 283 is turned off, and the voltage S12 of the timer capacitor 284 is coupled to the ground through a transistor 285 controlled by the signal S13. According to the configuration, the timer capacitor 284 of the timer 211 is charged from 0V each time while the control system starts the DC voltage source 201A from 0V.

There are two DC voltage sources in this embodiment, one is the DC voltage source 201 driving the fluorescent lamp, and the other is the control system DC voltage source 201A providing a voltage required by the entire control system. In this embodiment, the two voltages of the two DC voltage sources are different. In practice, they can be the same. The advantage of different voltage sources is that the interference to other devices caused by the semiconductor switch unit 202 is reduced when the semiconductor switch unit 202 is switches.

Figure 1C:
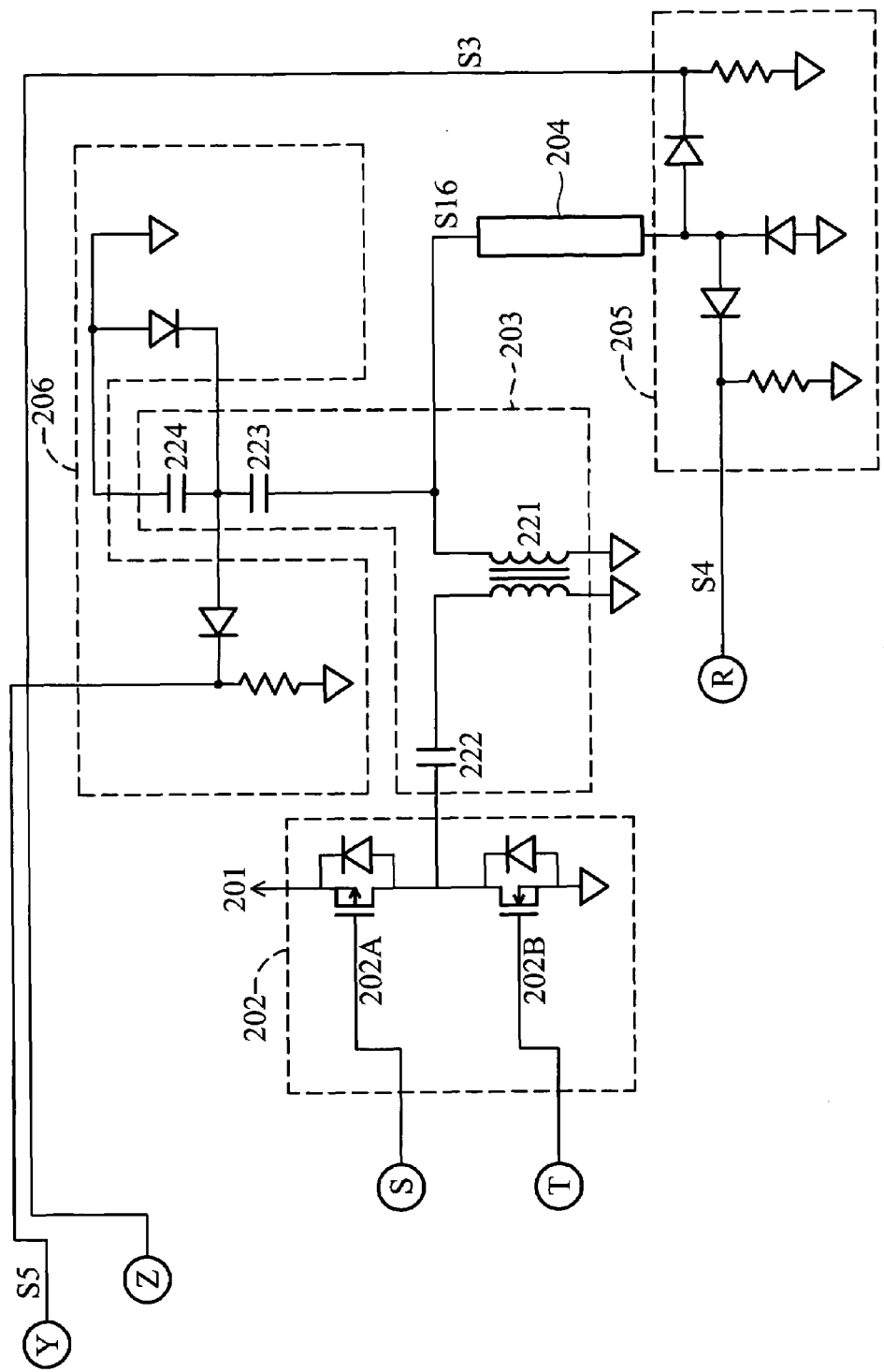
Figure 1D:
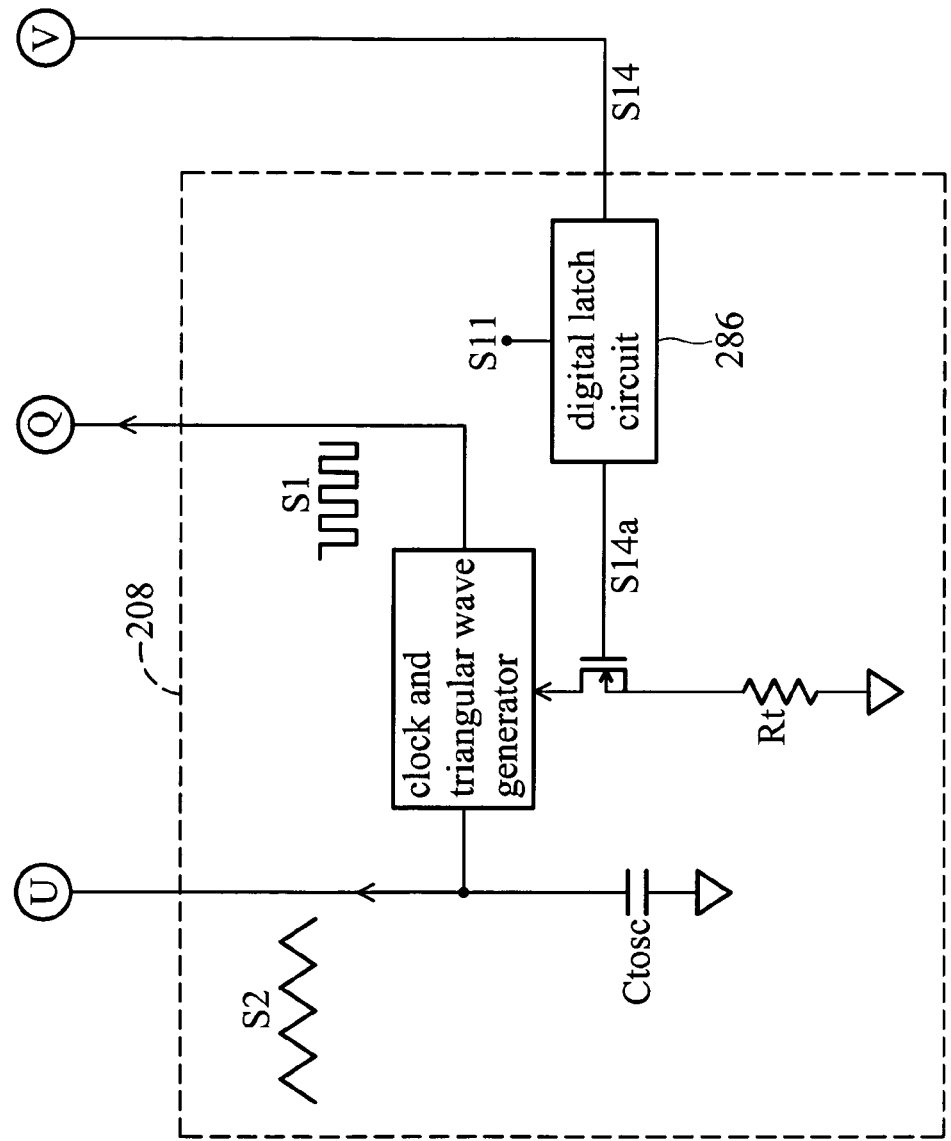

The frequency generator 208 is further controlled by a signal S14 indicating whether or not the fluorescent lamp 204 is turned on. Referring to FIG. 1d, a digital latch circuit 286 and the signal S14 operate in coordination to control the frequency generator 208. When the control system is just started, the reset signal S11 from the timer 211 sets the digital latch circuit 286 to output an output signal S14a correspond to the turned-off state of the fluorescent lamp 204. When the fluorescent lamp 204 is turned on, the output signal S14a of the digital latch circuit 286 is set and locked correspond to a state of the turned-on fluorescent lamp 204. When the output signal S14a of the digital latch circuit 286 indicates that the fluorescent lamp 204 is not turned on yet, the frequency generator 208 outputs a fluorescent lamp starting frequency. When the output signal S14a of the digital latch circuit 286 indicates that the fluorescent lamp 204 is turned on, the frequency generator 208 outputs a fluorescent lamp operating frequency to the driving device 209. In this embodiment, the operating frequency is preferably constant and is not controlled by other control signals except for the reset signal S11. The operating frequency is determined according to whether or not the fluorescent lamp 204 is turned on. The advantage of the operation is that the resonant frequencies of the resonant tank 203 are different when the fluorescent lamp 204 is turned on and off. Thus, different operating frequencies are used in different states of the fluorescent lamp 204. A normal system can operate at a frequency near the resonance frequency of the resonant tank 203 regardless of the fluorescent lamp 204 being turned on and off, enhancing system efficiency. The signal S 14 is determined by the signal S3 from the current detecting circuit 205 and a comparator 274 of the protection circuit 210. When the signal S3 exceeds a reference level Vref4, the fluorescent lamp 204 is regarded as turned on.

The detailed operations are described in the following.

When the system is started and provided with voltage, the timer 211 starts charging the timer capacitor 284. Before the timer capacitor 284 is not charged to the reference level Vref1, the reset signal S11 from the timer 211 turns on a transistor 266 and stops the current source 268 outputting current. The output signal S8b of the comparator 269 is forced to have a zero duty cycle, so that the duty cycle of the output signal S8 of the pulse width modulator 207 becomes 0%. The duty cycle of the driving output signals OUT1 and OUT2 also becomes 0% according to the reset signal S11, and the driving device 209 stops the semiconductor switch unit 202 being turned on by the output signals OUT1 and OUT2.

When the timer capacitor 284 is continuously charged to be larger than the reference level Vref1, the reset signal S11 cancels the reset state, so that the turned-on transistor 266 is turned off. The soft-start current source 268 charges the soft-start capacitor 271 and generates a voltage signal S20 rising slowly in the capacitor 271.

The pulse width modulator 207 starts to operate. An inverting input terminal of the error amplifier 261 maintains at a voltage low than a reference level Vref5 because the fluorescent lamp 204 is not turned on yet. At this time, the output signal S6 of the error amplifier 261 maintains a high level. The comparator 264 compares the high level signal S6 and the triangular wave signal S2 and outputs the output signal S8a of pulse width modulation (PWM) with a 100% duty cycle according to the comparison result.

The other comparator 269 of the pulse width modulator 207 compares the slowly rising voltage signal S20 and the triangular wave signal S2 and outputs the output signal S8b whose duty cycle is slowly increased from 0%.

The two PWM signal, the output signal S8a with the 100% duty cycle and the output signal S8b whose duty cycle is slowly increased from 0%, are input to the logic gate 270 and calculated logically. The logic gate 270 then generates the output signal S8 whose duty cycle is slowly increased from 0%. The semiconductor switch unit 202 is controlled by control signals with a slowly increased duty cycle output from the signal transforming circuit 209a. Namely, the semiconductor switch unit 202 transmits the power of DC voltage source 201 to the resonant tank 203 with a duty cycle that has an increasing rate limited to a predetermined rate.

The driving device 209 receives the output signal S8 and the pulse signal S1 and generates the driving output signals OUT1 and OUT2. The driving output signals OUT1 and OUT2 pass through the signal transforming circuit 209a and then respectively turn the switches 202A and 202B on or off to adjust the power provided to the fluorescent lamp 204.

Before the fluorescent lamp 204 is turned on, the voltage S16 of the fluorescent lamp 204 rises due to the gradually increased duty cycle of the output signal S8. When detecting that signal S5 indicating the voltage of the fluorescent lamp 204 exceeds a predetermined reference level Vref6, the protection circuit 210 outputs a signal S17 to turn on the switch 267 and couple the current source 265 to the inverting input terminal of the error amplifier 261. The output signal S6 of the error amplifier 261 becomes small, reducing the duty cycle of the corresponding PWM output signal S8a.

When the duty cycle of PWM output signal S8a is shorter then that of the PWM output signal. S8b, the duty cycle of the PWM output signal S8 of the pulse width modulator 207 is reduced to decrease the power provided to the fluorescent lamp 204.

If the decreased power status causes the level of the signal S5 indicating the voltage of the fluorescent lamp 204 smaller than the reference level Vref6, the switch 267 of the current source 265 is turned off, and the output signal S6 of the error amplifier 261 becomes larger, so that the duty cycle of the PWM output signal S8 of the pulse width modulator 207 is increased. The voltage S16 of the fluorescent lamp 204 is stably adjusted in this feedback loop configuration.

During the process in which the voltage S16 of the fluorescent lamp 204 is stably adjusted, the voltage signal S20 of the soft-start capacitor 271 contiguously rises, so that the duty cycle of the PWM output signal S8b of the pulse width modulator 207 becomes and maintains at 100%. Since the duty cycle of the PWM output signal S8b maintains at 100%, the duty cycle of the PWM output signal S8 is determined by the PWM output signal S8a afterward.

When the fluorescent lamp 204 is turned on by the sufficient voltage S16, the voltage S16 is quickly decreased to smaller than one half and approximates a constant operating voltage, thus the voltage detecting circuit 206 becomes inactive because it can not generate a signal S5 larger than the reference level Vref6. At the same time, the current detecting circuit 205 outputs the signal S3 indicating the state of the fluorescent lamp 204 to the protection circuit 210. The protection circuit 210 generates the signal S14 indicating the state of the fluorescent lamp 204 to change the output frequency of the frequency generator 208. The current detecting circuit 205 further outputs the signal S4 indicating the value of the current flowing through the fluorescent lamp 204 to the error amplifier 261 of the pulse width modulator 207, so that the current flowing through the fluorescent lamp 204 is stably maintained at a predetermined value by the feedback control.

The protection circuit 210 can provide protection statuses, such as when the fluorescent lamp 204 is not connected, the fluorescent lamp 204 is damaged, electric leakage occurs in the transformer 221, and so on. The detailed operations are described in the following:

When the fluorescent lamp 204 is not connected from the beginning, the signal S5 indicating the voltage of the fluorescent lamp 204 continuously outputs messages indicating that the voltage of the fluorescent lamp 204 exceeds the reference level Vref6 to the logic control circuit 272. The logic control circuit 272 is reset by the reset signal S11 as the control system is just started, and so the protection operations of the logic control circuit 272 are cancelled. The logic control circuit 272 is not started until the signal S10 is input. When the signal S10 is input to the logic control circuit 272 and the voltage of the fluorescent lamp 204 exceeds the reference level Vref6, the logic control circuit 272 counts time by a digital timer unit within the logic control circuit 272 with the pulse signal S1 from the frequency generator 208. Once the voltage of the fluorescent lamp 204 contiguously exceeds the reference level Vref6 for a predetermined period, the logic control circuit 272 outputs a stop-outputting signal S18 to the driving device 209 to stop turning on the switches 202A and 202B.

When the fluorescent lamp 204 is damaged and an open circuit is formed, the current detecting circuit 205 outputs the signal S3 to indicate that the fluorescent lamp 204 is turned off, and the signal S3 passes through the comparator 274 of the protection circuit 210. The comparator 274 then outputs the signal S14 to the logic control circuit 272. Similarly, and the logic control circuit 272 is not active until the signal S10 is input. When the signal S10 is input to the logic control circuit 272, the logic control circuit 272 start to count time by the digital timer unit with the pulse signal S1 while the status of that the fluorescent lamp 204 is turned off. If the fluorescent lamp 204 is still turned off after a predetermined period, the logic control circuit 272 outputs a stop-outputting signal S18 to the driving device 209 to stop turning on the switches 202A and 202B.

When the transformer 221 is damaged due to electric leakage in normal mode, the effect of overload will occur in the system due to the extra loading caused by the electric leakage. In this status, the error amplifier 261 contiguously raises the signal S6 to provide sufficient power to the load and stabilize the current of the fluorescent lamp 204. When the leakage current exceeds the largest power provided by the system, the signal S6 output from the error amplifier 261 overtakes the peak value of the triangular wave signal S2. The protection circuit 210 compares the signal S6 from the error amplifier 261 and a reference level slightly higher than the peak value of the triangular wave signal S2 and generates a signal S19 indicating whether or not the system is overloaded. When the timer 211 starts the protection circuit 210 by the signal S10 and the system is overloaded, the logic control circuit 272 counts time with the pulse signal S1 from the frequency generator 208. Once the system is contiguously overloaded for a predetermined period, the logic control circuit 272 outputs a stop-outputting signal S18 to the driving device 209 to stop turning on the switches 202A and 202B.

Figures 1, 2A:
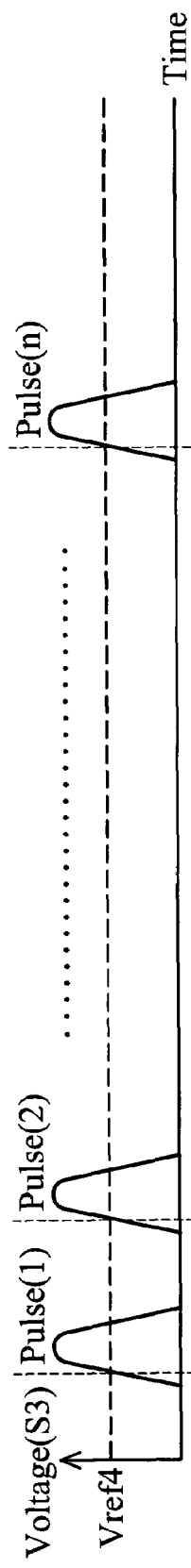

FIGS. 2a-1 to 2a-4, 2b-1 to 2b-4, and 2c-1 to 2c-4 are timing charts of embodiments of protection operations. FIGS. 2a-1 to 2a-4 depict the open protection. FIG. 2a-1 shows the voltage wave of the signal S3 that indicates the state of the fluorescent lamp 204 and is input to the protection circuit 210. The signal S3 could be a pulse whose voltage is larger than or smaller than the reference level Vref4, such as Pulse(1), Pulse (2), or Pulse(n) in FIG. 2a-1.

Figures 2, 2A:
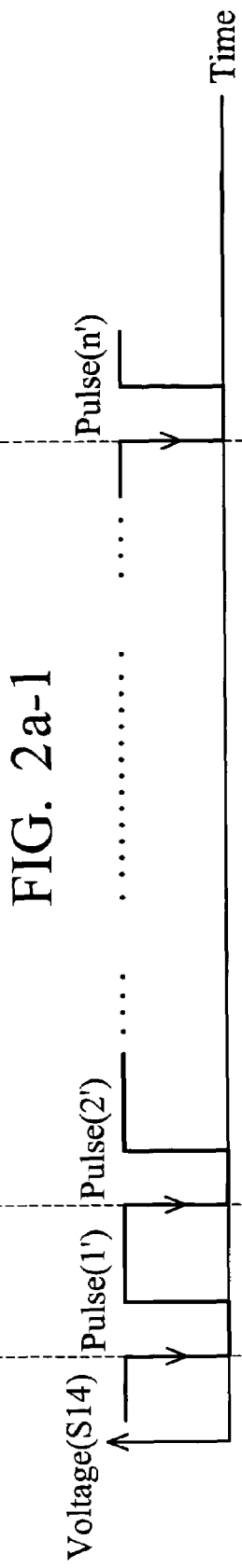

FIG. 2a-2 shows the signal S14 generated according to the comparison result between the signal S3 and the reference level Vref4. When the logic control circuit 272 of the protection circuit 210 is started by the signal S10, the falling edge of the signal S14 enables the logic control circuit 272 to generate an internal signal S3" by a delay td from the rising edges of a plurality of pulse signals S1, such as three pulse signals S1.

In FIG. 2a-1, when the signal S3 is the single pulse Pulse(1), the internal signal S3" of the logic control circuit 272 is a pulse signal Pulse(1") from t1 to t3. If the signal S3 is a continuous pulse signal, such as from Pulse(1) to Pulse(2), the internal signal S3" of the logic control circuit 272 is a pulse signal Pulse(2") from t1 to t4. In this embodiment, the detection period of the logic control circuit 272 is a period T_ERR_OPEN from t4 to t5, as shown in FIG. 2a-4. If the period T_ERR_OPEN does not exceed the predetermined period, the logic control circuit 272 cancels the error result and counts time again. If the period T_ERR_OPEN exceeds the predetermined period, the logic control circuit 272 locks the error result by an internal latch circuit and outputs the signal S18 to stop the switches 202A and 202B turning on.

In general, the signal S3 indicating the state of the fluorescent lamp 204 requires a capacitor for detecting. According to the above operations in FIGS. 2a-1 to 2a-4, the logic control circuit 272 of the present invention can directly detect the pulse signal through transforming S3 into S3" by the logic control circuit 272. Furthermore, the sensitivity of detecting devices can be controlled for avoiding frequent false alarms.

FIGS. 2b-1 to 2b-4 depict the over-voltage protection. FIG. 2b-1 shows the voltage wave of the signal S5 indicating the voltage of the fluorescent lamp 204 and outputted to the protection circuit 210. The signal S5 can be a pulse whose voltage is larger than or smaller than the reference level Vref6, such as Pulse(11), Pulse(12), or Pulse(1n) in FIG. 2b-1. When the logic control circuit 272 of the protection circuit 210 is started by the signal S10, the feedback signal S17 is generated according to the comparison result between the signal S5 and the reference level Vref6 by the comparator 276, such as Pulse(11'), Pulse(12'), and Pulse(1n') in FIG. 2b-2. The pulse signals S17 are received by the logic control circuit 272. The rising edge of the pulse signal S17 and the signal S1 operate in coordination to enable the logic control circuit 272. The rising edges of three pulse signals S1 form a delay td' and another internal signal S5" is thus generated.

In FIG. 2b-1, when the signal S5 is the single pulse Pulse(11), the logic control circuit 272 generates an internal pulse signal Pulse(11") whose width is from t1 to t3. If the signal S5 is a continuous pulse signal, such as from Pulse(11) to Pulse(1n), the logic control circuit 272 generates an internal pulse signal Pulse(1n") whose width is from t1 to t6. An error detecting device of the logic control circuit 272 counts the period T_ERR_OVER in which the internal pulse signal Pulse(1n") appears from t1. If the period T_ERR_OVER shorter than the predetermined period, the logic control circuit 272 cancels the error result and counts time again. If the period T_ERR_OVER exceeds the predetermined period, the logic control circuit 272 locks the error result by an internal latch circuit and outputs the signal S18 to stop the switches 202A and 202B turning on.

According to above operations in FIGS. 2b-1 to 2b-4, the sensitivity of detecting devices can be controlled by time delay for avoiding frequent false alarms.

FIGS. 2c-1 to 2c-4 depict the overload protection. In FIG. 2c-1, Pulse(21), Pulse(22), and Pulse(2n) are the wave form of the signal S6 output to the protection circuit 210. The signal S6 can be a pulse whose voltage is larger than or smaller than the reference level Vref7. The signal S19 is generated according to the comparison result between the signal S6 and the reference level Vref7 by the comparator 275, such as Pulse(21'), Pulse(22'), and Pulse(2n') in FIG. 2c-2. When the logic control circuit 272 of the protection circuit 210 is started by the signal S10, the rising edge of the signal S19 enables the logic control circuit 272 to generate an internal signal S3" by a delay td" from the rising edges of a plurality of pulse signals, such as three pulse signals.

In FIG. 2c-1, when the signal S6 is the single pulse Pulse(21), the logic control circuit 272 generates an internal pulse signal Pulse(21") whose width is from t1 to t3. If the signal S6 is a continuous pulse signal, such as from Pulse(21) to Pulse(2n), the logic control circuit 272 generates an internal pulse signal Pulse(2n") whose width is from t1 to t6. An error detecting device of the logic control circuit 272 counts the period T_ERR_LEAK in which the internal pulse signal Pulse(2n") appears from t1. If the period T_ERR_LEAK is shorter than the predetermined period, the logic control circuit 272 cancels the error result and counts time again. If the period T_ERR_LEAK exceeds the predetermined period, the logic control circuit 272 locks the error result by an internal latch circuit and outputs the signal S18 to stop the switches 202A and 202B from turning on.

According to above operations in FIGS. 2c-1 to 2c-4, the sensitivity of detecting devices can be controlled by time delay for avoiding frequent false alarms.

Figures 2, 2A, 3:
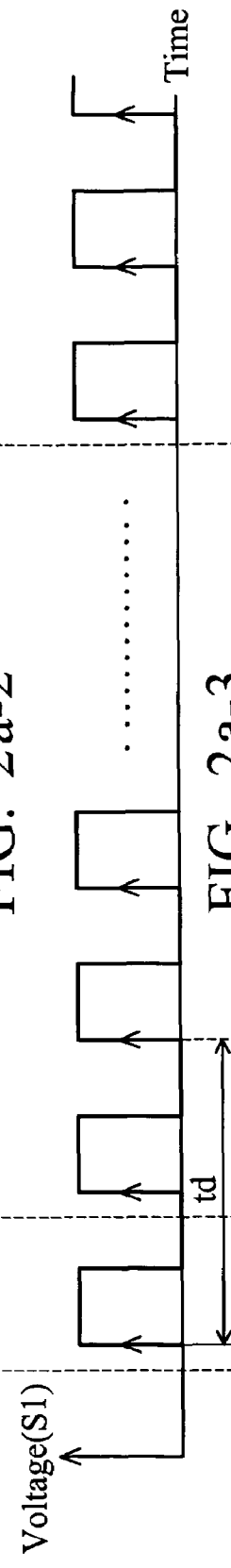

According to the disclosed embodiments, the fluorescent lamp 204 can be driven by other means. As shown in FIG. 3, the signal transforming circuit 209a in FIG. 1b can be replaced by a circuit 209a', and the semiconductor switch unit 202 in FIG. 1c can be replaced by a circuit unit 202' comprising two NMOS or PMOS transistors. The transformer 221 in FIG. 1c is replaced by a central tap transformer 221' in FIG. 3. A DC voltage source 201' corresponds to the DC voltage source 201. The circuit coupled to the secondary winding of the transformer 221' is the same as the circuit coupled to the secondary winding of the transformer 221.

Figures 2, 2A, 3, 4:
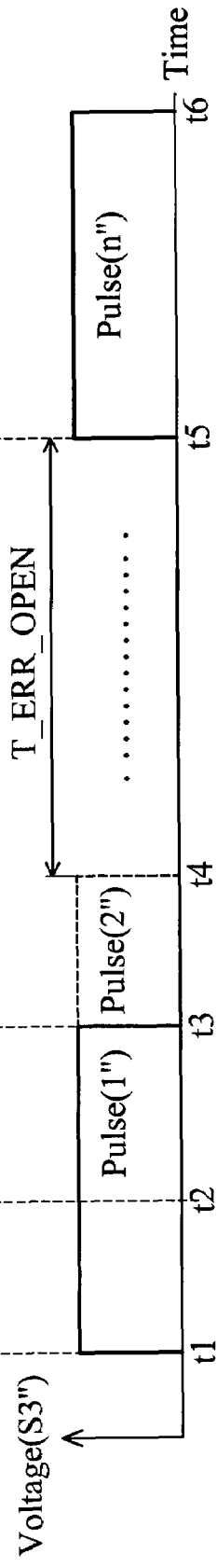
Figure 3:
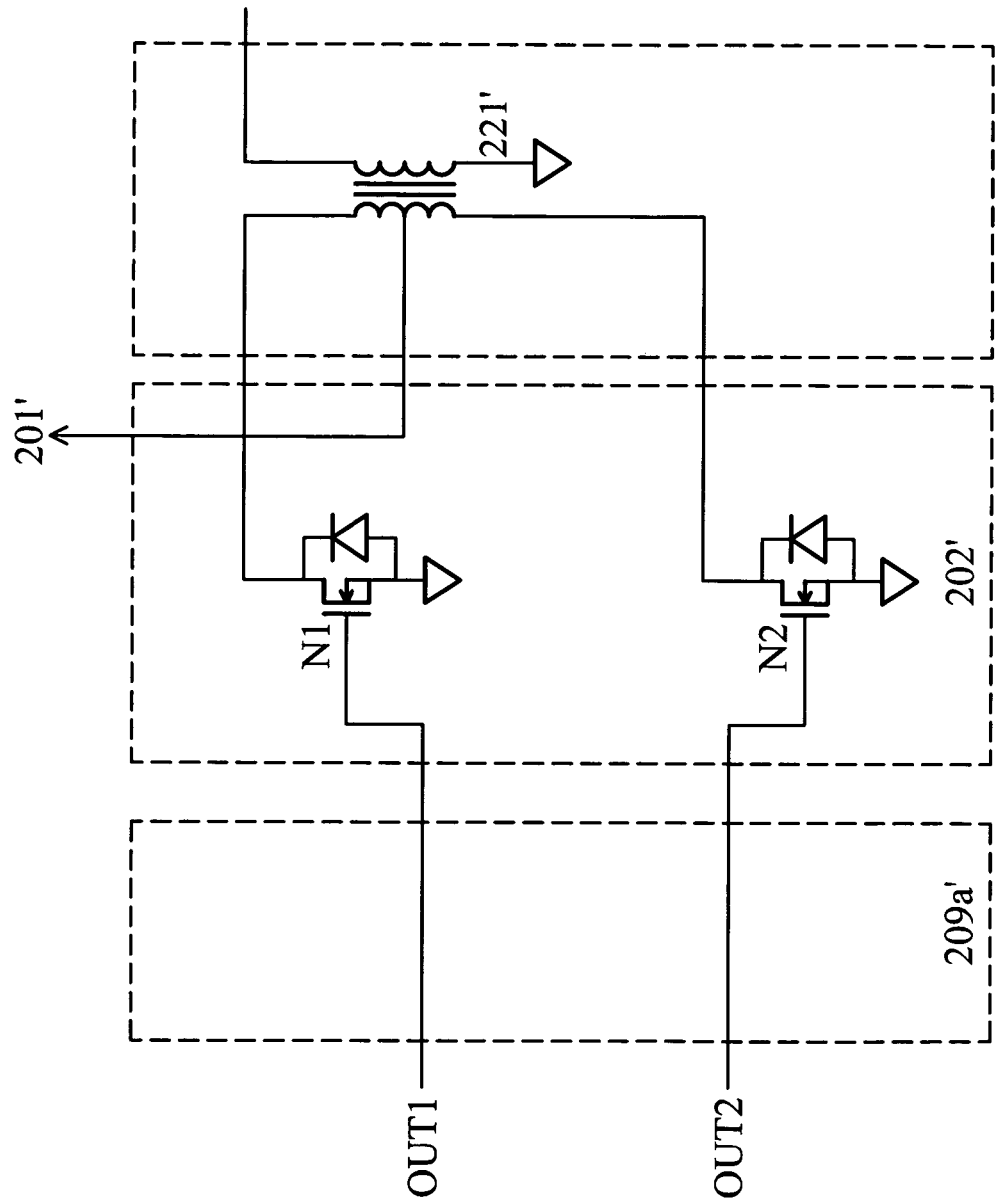
Figure 4:
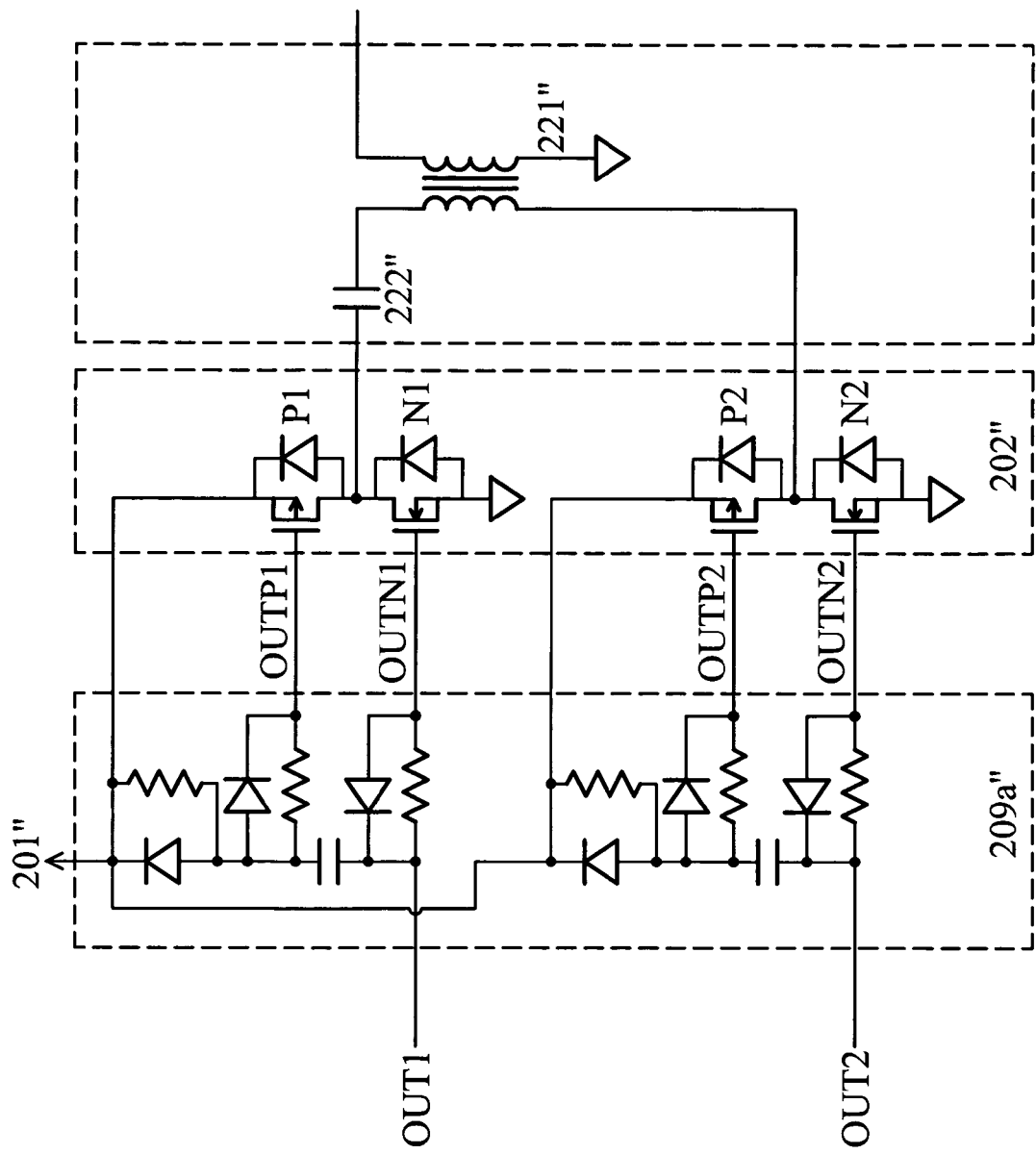

Some peripheral elements are applied in the DC/AC driving circuit for driving the fluorescent lamp 204 by a half-bridge semiconductor switch, as shown in FIG. 4. In the embodiment of FIG. 4, a signal transforming circuit 209a" corresponding to the signal transforming circuit 209a transforms the driving output signals OUT1 and OUT2 of the driving device 209 into signals OUT1P, OUT1N, OUT2P, and OUT2N to respectively control elements P1, N1, P2, and N2 in the semiconductor switch unit 202". The semiconductor switch unit 202" corresponds to the semiconductor switch unit 202. The power of a DC voltage source 201" corresponding to the DC voltage source 201 is transmitted to the resonance capacitors 222" corresponding to the resonance capacitors 222 and the transformer 221" corresponding to the transformer 221 by the pulse form. In the embodiment of FIG. 4, the circuits coupled to the secondary winding of the transformer 221" is the same as the circuits coupled to the secondary winding of the transformer 221.

The disclosed timer and the protection circuit can be applied in various power supply circuits without the limitation of the DC/AC driving circuit. Moreover, a fluorescent lamp is given as an example. In practice, a light-emitting device or other load can be applied in the DC/AC driving circuit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller for a driving circuit of power source, comprising:
   a frequency generator comprising a latch circuit, wherein the frequency generator provides a pulse signal at a first frequency after the controller is started, and the frequency generator changes the frequency of the pulse signal from the first frequency to a second frequency and locks the frequency of the pulse signal at the second frequency after the latch circuit receives an indicating signal;
   a pulse width modulator providing a pulse width modulation (PWM) signal according to the pulse signal and a feedback signal which indicates a status of electric power supply of the driving circuit; and
   a driving device controlling a plurality of semiconductor switches according to the PWM signal.

2. The controller as claimed in claim 1, wherein the pulse width modulator comprises a soft-start unit outputting a soft-start signal after the controller is started, so that the pulse width modulator provides the PWM signal further according to the soft-start signal.

3. The controller as claimed in claim 2, wherein the soft-start unit comprises a soft-start comparator, a soft-start current source, and a soft-start capacitor, the soft-start current source charges the soft-start capacitor after the controller is started, and the soft-start comparator outputs the soft-start signal according to the pulse signal and a voltage signal of the soft-start capacitor.

4. The controller as claimed in claim 3 further comprising a timer outputting a reset signal in a period from starting the controller to a first predetermined time point.

5. The controller as claimed in claim 4, wherein the driving device controls the semiconductor switches to stop outputting a power when receiving the reset signal.

6. The controller as claimed in claim 1 further comprising a protection circuit determining the status of electric power supply of the driving circuit to a load according to a signal of a feedback loop of the driving circuit, wherein the protection circuit outputs the indicating signal when the load is turned-on.

7. The controller as claimed in claim 6, wherein when the protection circuit determines that the status of electric power supply to the load exceeds a predetermined range, the protection circuit outputs a stop signal, so that the driving device controls the semiconductor switches to stop outputting a power to the load according to the stop signal.

8. The controller as claimed in claim 1, wherein the driving circuit is coupled to a first voltage source providing a load with power, and the controller is coupled to a second voltage source providing power required by the controller to operate.

9. A DC/AC driving circuit for driving a fluorescent lamp comprising:
   at least one switch coupled to a first power source;
   a controller outputting at least one driving control signal corresponding to the at least one switch to control power transmission of the power source;
   a resonant tank having a first side and a second side, wherein the first side is coupled to the at least one switch, and the second side is coupled to the fluorescent lamp to provide power to the fluorescent lamp; and
   a feedback loop coupled to the fluorescent lamp and outputting an indicating signal to the controller when the fluorescent lamp is turned on;
   wherein the controller controls the at least one driving control signal to be at a first frequency after the DC/AC driving circuit is started, and the controller changes the at least one driving control signal from the first frequency to a second frequency and the at least one driving control signal is locked at the second frequency after the controller receives the indicating signal.

10. The DC/AC driving circuit as claimed in claim 9, wherein the controller controls the first power source not to supply power to fluorescent lamp in a first predetermined period from starting the DC/AC driving circuit.

11. The DC/AC driving circuit as claimed in claim 10, wherein the controller is coupled to a second power source.

12. The DC/AC driving circuit as claimed in claim 9, wherein the at least one driving control signal controls the power transmission of the first power source with a duty cycle that has an increasing rate not exceed a predetermined rate before the controller receives the indicating signal.

13. The DC/AC driving circuit as claimed in claim 12, wherein the controller is coupled to a second power source.

14. The DC/AC driving circuit as claimed in claim 9, wherein the controller comprises a protection circuit and a detecting circuit, the protection circuit comprising:
   a comparator receiving a detecting signal of the detecting circuit and a reference signal and outputting a comparison signal when a relationship between the detecting signal and the reference signal conforms with a predetermined condition; and
   a logic control circuit receiving the comparison signal and a pulse signal and generating a status signal with a period longer than a plurality of cycle periods of the pulse signal when the logic control circuit receives the comparison signal, wherein the protection circuit outputs a protection signal when the status signal is output or not output continuously for a predetermined time.

15. The DC/AC driving circuit as claimed in claim 14, wherein the logic control circuit outputs the status signal when the logic control circuit detects a falling edge or rising edge of the comparison signal.

16. The DC/AC driving circuit as claimed in claim 9 further comprising a signal transforming circuit;
   wherein the at least one switch comprises a PMOS switch and an NMOS switch; and
   wherein the signal transforming circuit transforms the at least one driving control signal from the controller to control PMOS switch and the NMOS switch to turn on or off.

17. The DC/AC driving circuit as claimed in claim 9, wherein the resonant tank comprises a coil transformer, the at least one switch is a half-bridge switch, and the half-bridge switch is coupled to the coil transformer by a central tap type.

18. A protection circuit for protecting an operation of a power driving circuit, comprising:
   a comparator receiving a detecting signal and a reference signal, and outputting a comparison signal when a relationship between the detecting signal and the reference signal conforms with a predetermined condition; and
   a logic control circuit receiving the comparison signal and a pulse signal and generating a status signal with a period longer than a plurality of cycle periods of the pulse signal when the logic control circuit receives the comparison signal, wherein the protection circuit outputs a protection signal when the status signal is output or not output continuously for a predetermined time.

19. The protection circuit as claimed in claim 18, wherein the logic control circuit outputs the status signal when the logic control circuit detects a falling edge or rising edge of the comparison signal.

20. The protection circuit as claimed in claim 19, wherein when the power driving circuit receives a protecting signal, the power driving circuit stops providing power.

* * * * *